US007194443B1

(12) United States Patent
Post et al.

(10) Patent No.: US 7,194,443 B1
(45) Date of Patent: Mar. 20, 2007

(54) METHOD FOR PROTECTING A SECURITY MODULE AND ARRANGEMENT FOR THE IMPLEMENTATION OF THE METHOD

(75) Inventors: Peter Post, Berlin (DE); Dirk Rosenau, Berlin (DE); Torsten Schlaaff, Zepernick (DE)

(73) Assignee: Francotyp-Postalia AG & Co. (DE)

( * ) Notice: Subject to any disclaimer, the term of this patent is extended or adjusted under 35 U.S.C. 154(b) by 0 days.

(21) Appl. No.: 09/522,619

(22) Filed: Mar. 10, 2000

(30) Foreign Application Priority Data

Mar. 12, 1999 (DE) ................................ 199 12 781
Jun. 15, 1999 (DE) ................................ 199 28 057

(51) Int. Cl.
*G06F 12/14* (2006.01)
*G08B 29/00* (2006.01)

(52) U.S. Cl. ...................... 705/405; 705/405; 705/410; 726/34; 726/35; 726/16; 726/17; 726/21

(58) Field of Classification Search ................ 705/405, 705/410; 426/34, 35, 16, 17
See application file for complete search history.

(56) References Cited

U.S. PATENT DOCUMENTS 4,217,484 A * 8/1980 Gerst ........................ 235/30 A
4,575,621 A 3/1986 Dreifus
4,746,234 A 5/1988 Harry
4,804,957 A 2/1989 Selph et al.
4,823,323 A 4/1989 Higuchi
5,097,253 A 3/1992 Eschbach et al.
5,353,350 A 10/1994 Unsworth et al.
5,490,077 A 2/1996 Freytag
5,515,540 A 5/1996 Grider et al.
5,548,163 A * 8/1996 French ........................ 180/287
5,606,508 A 2/1997 Thiel
5,671,146 A 9/1997 Windel et al.
5,680,463 A 10/1997 Windel et al.

(Continued)

FOREIGN PATENT DOCUMENTS

DE OS 42 17 830 12/1993

(Continued)

OTHER PUBLICATIONS

Jim Carr, "SNA and LU6.2 Connectivity", Feb. 1, 1991, NetworkMegazine.com□□printed from "http://www.networkmegazine.com/article/NMG20000724S0045/2".*
Information on batteries used in computers.□□printed form "www.howstuffworks.com".*

(Continued)

*Primary Examiner*—Naresh Vig
(74) *Attorney, Agent, or Firm*—Schiff Hardin LLP

(57) ABSTRACT

In a security module and a method for protecting a security module, wherein security-relevant data are stored in a memory in the module, proper insertion of the security module on a device motherboard is monitored with a first function unit and a second function in the security module. The first function unit signals the status of the security module. The second function unit detects improper use or improper replacement of the security module, and upon detection of improper use or improper replacement, the second function unit causes the security-relevant data to be erased.

8 Claims, 7 Drawing Sheets

U.S. PATENT DOCUMENTS

| | | | | |
|---|---|---|---|---|
| 5,712,916 | A | 1/1998 | Windel et al. | |
| 5,734,723 | A | 3/1998 | Windel et al. | |
| 5,805,711 | A * | 9/1998 | Windel et al. | 380/55 |
| 5,960,084 | A * | 9/1999 | Angelo | 713/185 |
| 6,019,281 | A * | 2/2000 | Emmett et al. | 235/375 |
| 6,456,987 | B1 * | 9/2002 | Pauschinger | 705/408 |

FOREIGN PATENT DOCUMENTS

| | | |
|---|---|---|
| DE | PS 43 33 156 | 8/1995 |
| DE | PS 196 05 015 | 3/1997 |
| EP | 19515 A2 * | 11/1980 |
| EP | 0 417 447 | 7/1990 |
| EP | 0 789 333 | 1/1997 |
| EP | 0 891 601 | 3/1997 |
| GB | 2 303 173 | 2/1997 |
| WO | WO 98/20461 | 5/1998 |

OTHER PUBLICATIONS

Jim Carr, "SNA and LU6.2 Connectivity", Feb. 1, 1991, NetworkMegazine.com.*

Information on batteries used in computers printed from "www.howstuffworks.com".*

Hughes Network Systems First To Partner To Become QwestLinked, Feb. 9, 1998.*

Wayne Carter, Hughes Ready For Brave SVC World Solution Offers End-to-End Frame Relay Over Public Lines, Apr. 14, 1997.*

HNS First To Deliver IP and SNA Services On Demand Using Frame Relay SVCs, Apr. 29, 1997.*

"Information Based Indicia Program Postal Security Device Specification", United States Postal Service, Jun. 13, 1996.

* cited by examiner

| Status No: | LEDs | Lit | Blink-ing | Out | Display | Meaning |
|---|---|---|---|---|---|---|
| 220 | R | | | X | Green - Lit | OK |
| | G | X | | | | |
| 230 | R | X | | | Red - Lit | Error from Static Test |
| | G | | | X | | |
| 240 | R | X | | | Orange - Lit | Error from Dynamic Test |
| | G | X | | | | |
| 250 | R | | X | | Red - Blinking | Long Time witjh-out Contact |
| | G | | | X | | |
| 260 | R | | | X | Green - Blinking | Key not Entered |
| | G | | X | | | |
| 270 | R | | X | | Orange - Blinking | Suspect |
| | G | | X | | | |
| 280 | R | X | | | Red Lit Orange Blinking | Temperatur zu hoch |
| | G | | X | | | |
| 290 | R | | X | | Green Lit, Orange Blinking | Battery Replace-ment needed |
| | G | X | | | | |

METHOD FOR PROTECTING A SECURITY MODULE AND ARRANGEMENT FOR THE IMPLEMENTATION OF THE METHOD

BACKGROUND OF THE INVENTION

1. Field of the Invention

The present invention is directed to a method for protecting a security module and to an arrangement for the implementation of the method, particularly a postal security module suitable for use in a postage meter machine or mail-processing machine or a computer with mail-processing capability.

2. Description of the Prior Art

Modern postage meter machines, such as the thermal transfer postage meter machine disclosed in U.S. Pat. No. 4,746,234, utilize a fully electronic, digital printer. It is thus fundamentally possible to print arbitrary texts and special characters in the franking imprint printing field and an advertising slogan that is arbitrary or allocated to a cost center. For example, the postage meter machine T1000 of the Francotyp-Postalia AG & Co. has a microprocessor that is surrounded by a secured housing that has an opening for the delivery of a letter. When a letter is supplied, a mechanical letter sensor (microswitch) communicates a print request signal to the microprocessor. The franking imprint contains previously entered and stored, postal information for conveying the letter. The control unit of the postage meter machine undertakes an accounting controlled by software, exercises a monitoring function, possibly with respect to the conditions for a data updating, and controls the reloading of a postage credit.

U.S. Pat. No. 5,606,508 (corresponding to German OS 42 13 278) and U.S. Pat. No. 5,490,077 disclose a data input, such as with chip cards, for the aforementioned thermal transfer postage meter machine. One of the chip cards loads new data into the postage meter machine, and a set of further chip cards allows a setting of correspondingly stored data to be undertaken by plugging in a chip card. The data loading and the setting of the postage meter machine can thus ensue more comfortably and faster than by keyboard input. A postage meter machine for franking postal matter is equipped with a printer for printing the postage value stamp on the postal matter, with a controller for controlling the printing and the peripheral components of the postage meter machine, with a debiting unit for debiting postal fees, with at least one non-volatile memory for storing postage fee data, with at least one non-volatile memory for storing security-relevant data and with a calendar/clock. The non-volatile memory of the security-relevant data and/or the calendar/clock is usually supplied by a battery. In known postage meter machines, security-relevant data (cryptographic keys and the like) are secured in non-volatile memories. These memories are EEPROM, FRAM or battery-protected SRAM. Known postage meter machines also often have an internal real time clock RTC that is supplied by a battery. For example, potted modules are known that contain integrated circuits and a lithium battery. After the expiration of the service life of the battery, these modules must be replaced as a whole and disposed of. For economical and ecological reasons, it is more beneficial If only the battery needs to be replaced. To that end, however, the security housing must be opened and subsequently re-closed and sealed since security against attempted fraud is based essentially on the secured housing that surrounds the entire machine.

European Application 660 269 (U.S. Pat. No. 5,671,146), disclose a suitable method for improving the security of postage meter machines wherein a distinction is made between authorized and unauthorized opening of the security housing.

Repair of a postage meter machine is possible only with difficulty on site where the access to the components is rendered more difficult or limited. Given larger mail-processing machines or devices known as PC frankers, the protected housing in the future will be reduced only to the postal security module. This can improve accessibility to the other components. It would be extremely desirable for economic replacement of the battery for this to be replaced in a relatively simple way. The battery, however, would then be located outside the security area of the postage meter machine. When the battery posts are made accessible from the outside, however, a possible tamperer is able to manipulate the battery voltage. Known battery-supply SRAMs and RTCs have different demands with respect to their required operating voltage. The necessary voltage for holding data of SRAMs is below the required voltage for the operation of RTCs. This means that a reduction of the voltage below a specific limit value leads to an undesired behavior of the component: the RTC stands still and the time of day—stored in SRAM cells—and the memory contents of the SRAM are preserved. At least one of the security measures, for example long time watchdogs, would then be ineffective at the side of the postage meter machine. For a long time watchdog, the remote data center prescribes a time credit or a time duration, particularly a plurality of days or a specific day, by which the franking device should report via a communication connection. After the time credit is exhausted or after the term expires, franking is prevented. European Application 660 270 (U.S. Pat. No. 5,680,463) disclose a method for determining the presumed time duration up to the next credit reloading, and a data center considers any postage meter machine suspicious that does not report in time. Suspicious postage meter machines are reported to the postal authority, which monitors the mail stream of letters franked by suspicious postage meter machines. An expiration of the time credit or of the deadline is also already determined by the franking device and the user is requested to implement the overdue communication.

Security modules are already known from electronic data processing systems. For protection against break-in into an electronic system, European Patent 417 447 discloses a barrier that contains a power supply and a signal acquisition circuit as well as shielding in the housing. The shielding is composed of an encapsulation and electrical lines to which the power supply and signal acquisition circuits are connected. The latter reacts to a modification of the line resistance of the lines. Moreover, the security module contains an internal battery, a voltage switch-over from system voltage to battery voltage and further functional units (such as power gate, short-circuit transistor, memories and sensors). The power gate reacts when the voltage falls below a specific limit. When the line resistance, the temperature or the emission are modified, the logic reacts. The output of the short-circuit transistor is switched to a low logic level with the power gate or with the logic, resulting in a cryptographic key stored in the memory being erased. However, the service life of the non-replaceable battery, and thus of the security module, is too short for use in franking devices or mail-processing machines.

For example, JetMail®, which is commercially available from Francotyp-Postalia AG & Co. is a larger mail-processing machine. Here, a franking imprint is produced with a stationarily arranged ink jet print head with a non-horizontal, approximately vertical, letter transport. A suitable embodiment for a printer device is disclosed in German PS 196 05 015. The mail-processing machine has a meter and a base. If the meter is to be equipped with a housing which allows components to be more easily accessible, then it must be protected against attempted fraud by a postal security module that implements at least the accounting of the postage fees. In order to preclude influence on the program run, European Application 789 333 discloses equipping a security module with an application circuit (ASIC) that contains a hardware accounting unit. The application circuit (ASIC) also controls the print data transmission to the print head.

This approach would not be required if unique imprints were produced for each piece of mail. A method and arrangement for fast generation of a security imprint is disclosed, for example, by U.S. Pat. Nos. 5,680,463, 5,712,916 and 5,734,723. A specific security marking is thereby electronically generated and embedded into the print format.

Further measures for protecting a security module against tampering with the data stored therein are disclosed in German applications 198 16 572.2 and 198 16 571.4. The power consumption increases due to the use of a number of sensors, and a security module not constantly supplied by a system voltage then draws the current required for the sensors from its internal battery, which likewise prematurely drains the battery. The capacity of the battery and the power consumption thus limit the service life of a security module.

Like many other products, postage meter machines are modularly constructed. This modular structure enables the replacement of modules and components for various reasons. Thus, for example, malfunctioning modules can be removed and replaced by checked, repaired or new modules. Since extreme care is required in the replacement of an assembly that contains security-relevant data, the replacement usually requires a service technician and measures that, given improper use or unauthorized replacement of a security module, suppress the functioning thereof. Such measures are extremely complicated.

SUMMARY OF THE INVENTION

An object of the present invention is to assure protection against a security module being tampered with, requiring little outlay when the security module is replaceably mounted. The replacement should be possible in optimally simple way.

The above object is achieved in a method for protecting a security module in accordance with the invention having the steps of monitoring at least one of the status, the proper use or the replacement of the security module with at least two function units in the security module, signaling at least one status controlled by a first of the function units, and erasing sensitive (security relevant) data if an improper use or replacement is detected at least with a second of the function units.

Following the above steps, the security module is re-initialized with the first function unit by restoring previously erased, sensitive data following proper use or replacement of the security module, and the security module is placed back into operation by enabling the function units of the security module.

Replacement of the security module may have to be undertaken at some time. With a third function unit, both a replacement as a destroyed condition can be detected following a mechanical or chemical attack, whereupon the third function inhibits the security module.

The invention proceeds on the basis of identifying the replacement and use of a security module of a postage meter machine, mail-processing means or similar device with function units in order to be able to offer the users of the various devices assurance regarding the correct functioning of the security module, and thus of the overall device. Replacement of a security module is detected and a status is subsequently signaled when the security module is re-plugged and supplied with a system voltage. Modifications in the status of the security module are acquired with a first function unit and with a detection unit supplied by a battery, which has a self-holding capability that can be reset. The first function unit can interpret the respective condition when it is re-supplied with system voltage. The advantages are a fast reaction to modifications of the status of the security module and low battery power consumption of the circuit of the detection unit while the security module is not being supplied with the system voltage.

A second function unit monitors the battery voltage to determine whether (and when) the battery has become drained. Thereupon the need for a battery replacement is signaled, during which time supply of the system voltage to the security module must ensue. The possibility of improper use of a security module should be assumed at every replacement when not only is the system voltage absent, but also the replaceably arranged battery is removed. So that the replacement can be undertaken, preferably by personnel with little training and—in the future—even by the user himself, a further function unit monitors for voltage outage given replacement of the battery, and the first function unit initially erases sensitive data, and thus limits or even suppresses further use of the security module. An on-site inspection can be made by a service technician and if the housing is seen to be intact, authorization to restore the original scope of service is given. When placed back in operation later, the first function unit initiates a communication between the security module and a remote data center for enabling at least one function unit of the security module. If the security module was properly replaced, the sensitive data are re-initialized when the unit is placed back in operation. Methods having a digital or analog transmission path can be utilized for the communication.

If the entire security module was replaced without changing the battery, the sensitive data are likewise initially erased by the second function unit; however, the sensitive data can be re-initialized when the unit is placed back in operation. Methods employing a digital or analog transmission path can be utilized for communication with the remote data center. An inspection of the security module is then likewise initiated by a service technician. The security module can signal various statuses. Thus, for example, a distinction can be made as to whether the most recent contact with the data center was so far in the past that the unit already appears suspicious, or the last contact may have occurred long ago that a reinitialization is no longer allowed. The first function unit constantly interprets a first time credit. When this is exhausted, the suspicious status is signaled. The normal operating status can be restored by contacting the data center without an on-site inspection by service personnel being required. The time credit can be variable and may differ from security device to security device. The time credit can be prescribed by the data center and can be loaded into a memory of the security device at the time of installation.

The first function unit constantly interprets a second time credit. When this is exhausted, the status "LOST" is signaled. An on-site inspection of the security module by service is required in this instance.

The re-initialization is undertaken by the first function unit in conjunction with the communication with a remote data center after a dynamic detection of the plugged state was successfully made with the first function unit exchanging information during the detection via a current loop of the interface unit, the error-free transmission of this information being proof of a proper installation of the security module. The enabling of function units of the security module ensues by resetting them. The first function unit is a processor connected to the other function units that is programmed to identify the respective condition. The second function unit is a voltage monitoring unit with self-holding capable of being reset, and the third function unit is a detection circuit for detecting the unplugged condition having resettable self-holding.

The arrangement for the implementation of the method has a security module with a unit for supplying the security module with a system voltage or with a voltage from a battery, and a number of monitoring units, including at least a first function unit and a second function unit, and a unit for loading a time credit prescribed by the data center. A signal element is connected to the first function unit. Loading of data is undertaken into a memory of the security module upon installation and upon reloading. The first function unit interprets a time credit for time expiration and drives the signal element to signal the time expiration. The second function unit erases sensitive data in the memory if and when an improper use or replacement of the security module is detected.

DESCRIPTION OF THE PREFERRED EMBODIMENTS

Figure 1:
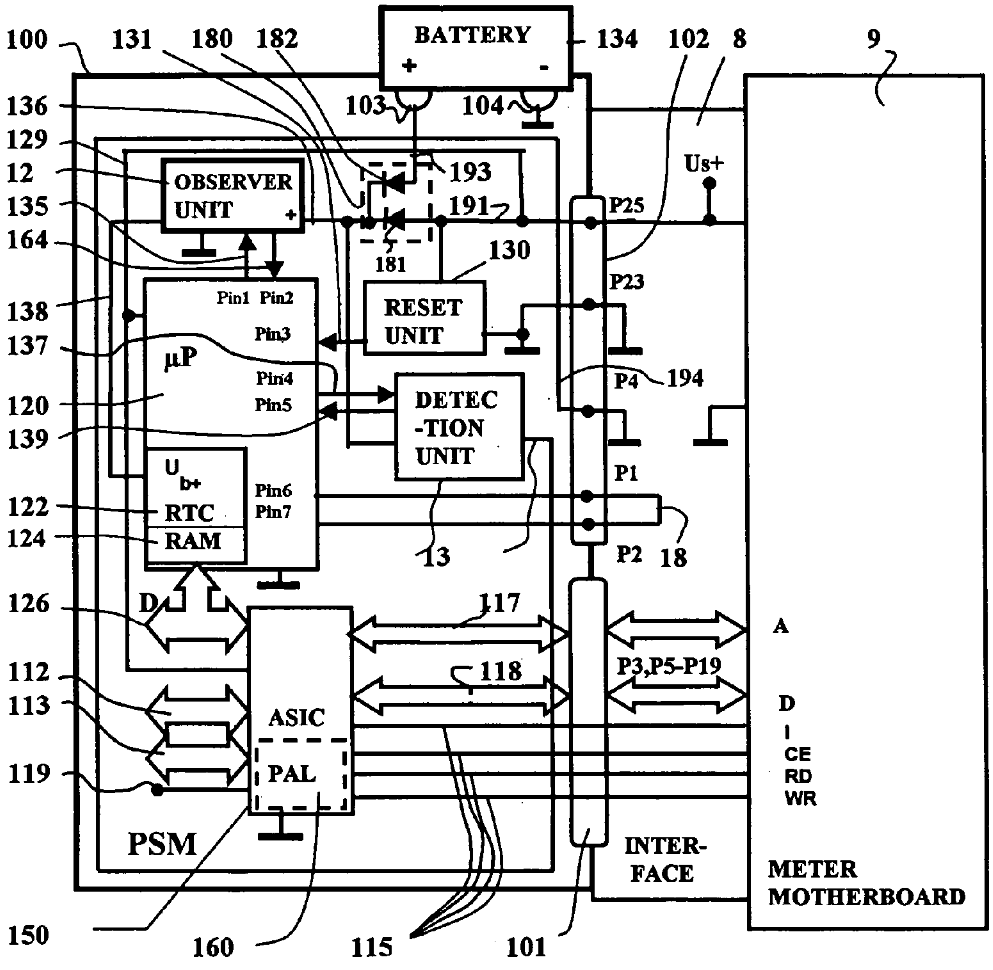
FIG. 1 is a block circuit diagram and interface of the inventive security module in a first embodiment.

FIG. 1 shows a block diagram of the security module 100 with the contact groups 101, 102 for connection to an interface 8 as well as to the battery contact posts 103 and 104 of a battery interface for a battery 134. Although the security module 100 is potted with a hard casting compound, the battery 134 of the security module 100 is replaceably arranged on a printed circuit board outside the casting compound. The printed circuit board carries the battery contact posts 103 and 104 for the connection of the poles of the battery 134. The security module 100 is plugged to a corresponding interface 8 of the motherboard 9 with the contact groups 101, 102. The first contact group 101 has a communicative connection to the system bus of a control unit, and the second contact group 102 serves the purpose of supplying the security module 100 with the system voltage. Address and data lines 117, 118 as well as control lines 115 proceed via the pins P3, P5–P19 of the contact group 101. The first contact group 101 and/or the second contact group 102 is/are fashioned for static and dynamic monitoring of the plugged state of the security module 100. The supply of the security module 100 with the system voltage of the motherboard 9 is realized via the pins P23 and P25 of the contact group 102, and a dynamic and static unplugged state detection by the security module 100 is realized via the pins P1, P2 or, respectively, P4.

In a known way, the security module 100 has a microprocessor 120 that contains an integrated read-only memory (internal ROM; not shown) with the specific application program that the postal authority or the respective mail carrier has approved for the postage meter machine. Alternatively, a standard read-only memory ROM or FLASH memory can be connected to the module-internal data bus 126.

In a known way, the security module 100 has a reset circuit unit 130, an application circuit (ASIC) 150 and a logic unit 160 that serves as a control signal generator for the ASIC. The reset circuit unit 130 or the application circuit 150 and the logic unit 160 as well as further memories which may be present (not shown) are supplied with system voltage $U_{s+}$ via the lines 191 and 129, this being supplied from the motherboard when the franking device is switched on. European Application 789 33 discloses the basic components of a postal security module that realize the functions of accounting and securing the postal fee data.

Via a diode 181 and the line 136, the system voltage $U_{s+}$ is also present at the input of the voltage monitoring unit 12. A second operating voltage $U_{b+}$ is supplied at the output of the voltage monitoring unit 12, this being available via the line 138. When the franking device is switched off, only the battery voltage $U_{b+}$ that is available, rather than the system voltage $U_{s+}$. The battery contact post 104 lying at the negative pole is connected to ground. Battery voltage is supplied from the battery contact post 103 at the positive pole, to the input of the voltage monitoring unit via a line 193, via a second diode 182 and via the line 136. Alternatively to the two diodes 181, 182, a commercially available circuit can be utilized as a voltage switchover 180.

The output of the voltage monitoring unit 12 is connected via a line 138 to an input for this second operating voltage $U_{b+}$ of the processor 120, this leading at least to a RAM memory area and guaranteeing a non-volatile storage thereat as long as the second operating voltage $U_{b+}$ is present with the required amplitude. The processor 120 preferably contains an internal RAM 124 and a real time clock (RTC) 122 as the aforementioned RAM area.

The voltage monitoring unit 12 in the security module 100 executes resettable self-holding that is interrogated by the processor 120 via a line 164 and can be reset via a line 135. For resetting the self-holding, the voltage monitoring unit 12 includes a circuit, wherein the resetting is triggered only when the battery voltage has risen above the predetermined threshold.

The lines 135 and 164 are respectively connected to terminals (pin 1 and pin 2) of the processor 120. The line 164 delivers a status signal to the processor 120, and the line 135 delivers a control signal to the voltage monitoring unit 12.

The line 136 at the input of the voltage monitoring unit 12 also supplies the unplugged status detection unit 13 with operating or battery voltage. The unplugged status detector unit 13 emits a status signal on the line 139 terminal (pin) P5 of the processor 120, that identifies a "plugged" or "unplugged" status by its logic level. The processor 120 interrogates the status of the detection unit 13 via the line 139. When normal operation is restored (after an "unplugged" status) the detection unit 13 is reset by the processor 120 from terminal P4 via the line 137. After being set, a static check for connection is carried out. To that end, ground potential that is present at the terminal P4 of the interface 8 of the postal security module PSM 100 is interrogated via a line 192 and can only be interrogated when the security module 100 is properly plugged in. With the security module 100 plugged in, the terminal P23 of the interface 8 is at ground potential of the negative pole 104 of the battery 134 of the postal security module PSM 100 and thus interrogation at the terminal P4 of the interface 8 can take place by the connection unit 13 via the line 192.

A line loop that is looped back via the pins P1 and P2 of the contact group 102 of the interface 8 to the processor 120 is at the pins 6 and 7 of the processor 120. For dynamic checking of the connected state of the postal security module PSM 100 to the motherboard 9, the processor 120 applies changing signal levels to the pins 6, 7 at absolutely irregular time intervals and these are looped back via the loop.

The postal security module 100 is equipped with a long life battery that also enables monitoring of usage without the security module 100 being connected to the system voltage of a postal processing means. The proper use, operation, installation or integration in the suitable environment are properties to be checked by the function units of the security module 100. An initial installation is undertaken by the manufacturer of the postal security module 100. Following this initial installation, the only thing that must be checked is whether the postal security module 100 is separated from its field of utilization (mail-processing means), this usually ensuing in the case of a replacement.

Monitoring of this status is undertaken by the unplugged status detection unit 13. A voltage level is monitored at the pin 4 of the interface unit 8 via the connection to ground. Given replacement of the function unit, this connection to ground is interrupted, and the unplugged status detection unit 13 registers this event as stored information. Since the storage of this information for every separation of the security module 100 from the interface unit 8 is assured by the specific, battery-operated circuit structure, an interpretation of this information can ensue at any time when a re-commissioning is desired. The regular interpretation of this unplugged condition signal on the line 138 of the unplugged condition detection unit 13 makes it possible for the processor 120 to erase sensitive data without modifying the accounting and customer data in the NVRAM memories.

The momentary status of the postal security module with the erased, sensitive data can be interpreted as a maintenance status when replacement, repair or other similar procedures are regularly undertaken. Since the sensitive data of the function unit are erased, an error due to tampering with the postal security module 100 is precluded. The sensitive data are, for example, cryptographic keys. The processor 120—in the maintenance status—prevents a core functionality of the postal security module such as, for example, an accounting and/or calculating of a security code for the security mark in a security imprint.

To be placed back into operation, the postal security module 100 is initially plugged-in and electrically connected to the corresponding interface unit 8 of a mail processing device. Subsequently, the device is turned on and thus the postal security module is again supplied with system voltage $U_{s+}$. Due to this specific status, the proper installation of the postal security module must now be re-checked by its function unit. To this end, a second stage of a check (dynamic plugged condition detection) is undertaken. The error-free transmission exchange of information serves as proof of the proper installation, this exchange taking place via an operative connection setup between the first function unit (processor 120) and the current loop 18 of the interface unit 8. This is a pre-requisite for a successful re-commissioning.

A re-initialization of the sensitive data is still additionally required for status change into the normal operating condition. A communication is undertaken between the postal security module 100 and a third party, such as a remote data center, which communicates the security data. After successful communication, the unplugged condition detection unit 13 is reset, and the postal security module 100 re-assumes its normal operating condition. The re-commissioning is thus completed.

Figure 2:
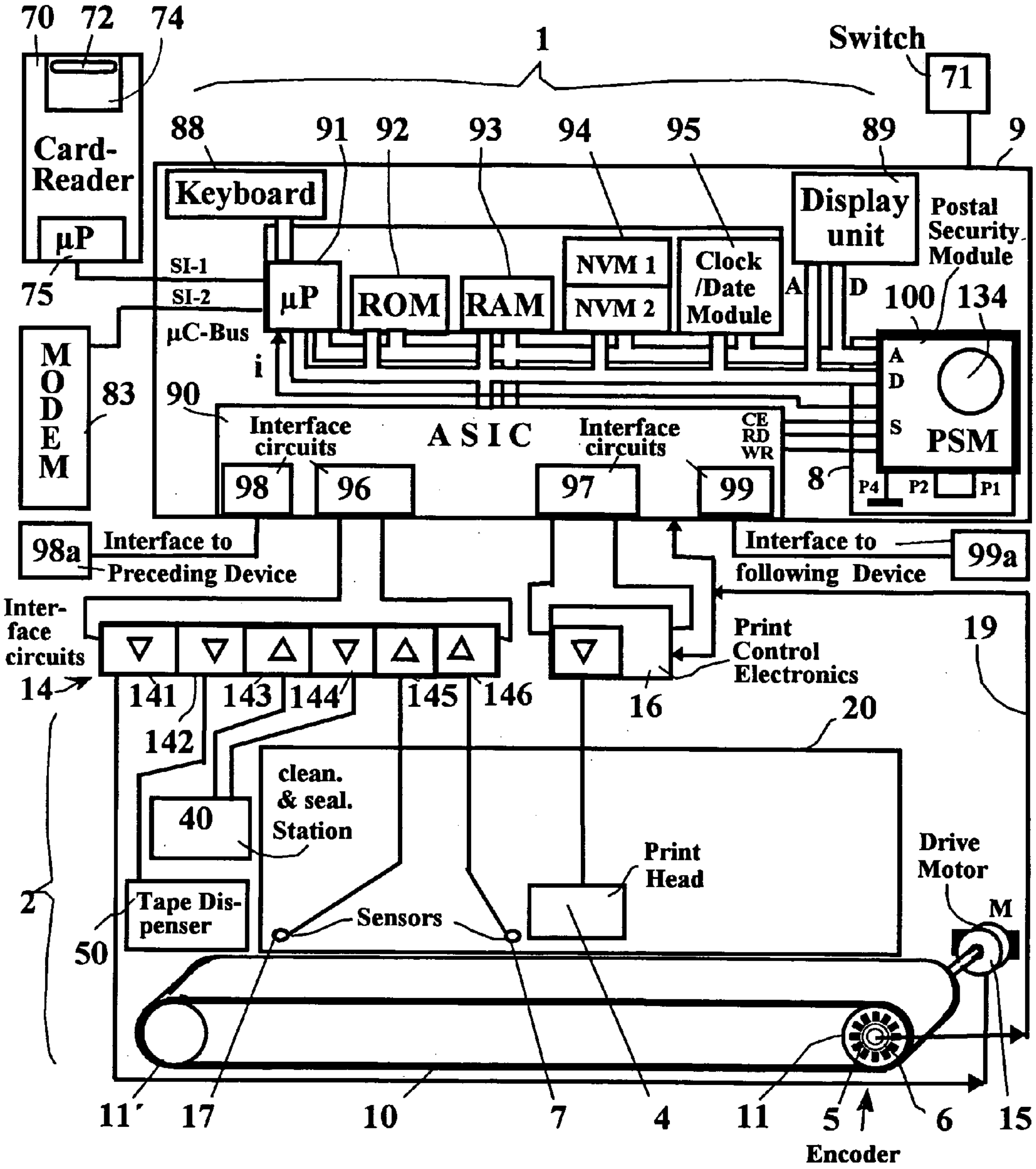
FIG. 2 is a block circuit diagram of an inventive postage meter machine.

FIG. 2 shows a block circuit diagram of a postage meter machine that is equipped with a chip card write/read unit 70 for reloading change data by chip card and with a printer 2 that is controlled by a control unit 1. The control unit 1 includes a motherboard 9 equipped with a microprocessor 91 with appertaining memories 92, 93, 94, 95.

The program memory 92 contains an operating program for printing and for security-relevant components.

The main memory RAM 93 serves for volatile intermediate storage of intermediate results. The non-volatile memory NVM 94 serves for non-volatile intermediate storage of data, for example statistical data that are organized according to cost centers. The calendar/clock module 95 likewise contains addressable but non-volatile memory areas for non-volatile intermediate storage of intermediate results or of known program parts as well (for example, for the DES algorithm). The control unit 1 is connected to the chip card write/read unit 70, and the microprocessor 91 of the control means 1 is programmed, for example, for loading the payload data N from the memory area of a chip card 49 into corresponding memory areas of the postage meter machine. A first chip card 49 plugged into a plug-in slot 72 of the chip card write/read unit 70 allows reloading of a data set into the postage meter machine for at least one application. The chip card 49, for example, contains the postage fees for all standard mail carrier services corresponding to the fee schedule of the postal authority, and contains a mail carrier identifier in order to generate a stamp format with the postage meter machine and frank the pieces of mail in conformity with the fee schedule of the postal authority.

The control unit 1 forms the actual meter with the components 91 through 95 of the aforementioned motherboard 9, and also has keyboard 88, a display unit 89 as well as an application-specific circuit ASIC 90 and the interface 8 for the postal security module PSM 100. The security module PSM 100 is connected via a control bus to the aforementioned ASIC 90 and to the microprocessor 91, and is also connected via the parallel μC bus to the components 91 through 95 of the motherboard 9 and is also connected to the display unit 89. The control bus carries lines for the signals CE, RD and WR between the security module PSM 100 and the aforementioned ASIC 90. The microprocessor 91 preferably has a pin for an interrupt signal i emitted by the security module PSM 100, further terminals for the keyboard 88, a serial interface SI-1 for the connection of the chip card write/read unit 70 and a serial interface SI-2 for the optional connection of a modem. With the modem, for example, the credit stored in the non-volatile memory of the postal security means PSM 100 can be incremented.

The postal security module PSM 100 is surrounded by a protective housing. Before every franking imprint, a hardware-implemented accounting is conducted in the postal security module PSM 100. The accounting ensues independently of cost centers. The postal security module PSM 100 can be internally implemented, disclosed in detail in European Application 789 333.

The ASIC 90 has a serial interface circuit 98 to a preceding device in the stream of mail, a serial interface circuit 96 to the sensors and actuators of the printer 2, a serial interface circuit 97 to the print control electronics 16 for the print head 4, and a serial interface circuit 99 to a device following the printer 21 in the mail stream. German OS 197 11 997 discloses a modified embodiment for the peripheral interface that is suitable for a number of peripheral devices (stations).

The interface circuit 96 coupled to the interface circuit 14 located in the machine base produces at least one connection to the sensors 7 and 17 and a motor encoder (described below) and to the actuators, for example to the drive motor 15 for the drum 11 and to a cleaning and sealing station RDS 40 for the ink jet print head 4, as well as to the label generator 50 in the machine base. The fundamental arrangement and the interaction between the ink jet print head 4 and the station 40 are described in German PS 197 26 642.

The sensor 17 arranged in the guide plate 20 and serves the purpose of preparing for initiating printing given letter transport. The sensor 7 serves the purpose of recognizing the start of the letter for triggering printing during letter transport. The conveyor is composed of a conveyor belt 10 and two drums 11, 11'. The drum 11 is a drive drum equipped with a motor 15; the drum 11' is the entrained tensioning drum. The drive drum 11 is preferably a toothed drum; and the conveyor belt 10 is a toothed belt, thereby assuring positive power transmission. An encoder is coupled to one of the drums 11, 11', in this embodiment the drive drum 11. The drive drum 11 together with an incremental generator 5 is preferably rigidly seated on a shaft. The incremental generator 5 is, for example, a slotted disk that interacts with a light barrier 6 to form the encoder and emits an encoder signal to the motherboard 9 via the line 19.

The individual print elements of the print head 4 are connected to print head electronics within the housing and the print head 4 can be driven for purely electronic printing. The print control ensues on the basis of the path control, with the selected stamp offset being taken into consideration, this being entered via the keyboard 88 or by chip card on demand and being stored in non-volatile fashion in the memory NVM 94. A predetermined imprint is derived from the stamp offset (without printing), the franking print format and, if needed further print formats for advertising slogan, shipping information (selective imprints) and additional messages that can be edited. The non-volatile memory NVM 94 contains a number of memory areas. These include areas that stored the postage fee tables that have been loaded in non-volatile fashion.

The chip card write/read unit 70 is composed of an appertaining mechanical carrier for the microprocessor card and a contacting unit 74. The contacting unit 74 allows dependable mechanical holding of the chip card in the read position and unambiguous signaling of when the read position of the chip card has been reached in the contacting unit 74. The microprocessor card with the microprocessor 75 has a programmed readability for all types of memory cards or chip cards. The interface to the postage meter machine is a serial interface according to the RS232 standard. The data transmission rate amounts to a minimum of 1.2 Kbaud. The power supply is energized with a switch 71 connected to the motherboard 9. After the power supply has been turned on, a self-test function with a readiness message ensues.

Figures 3, 9:
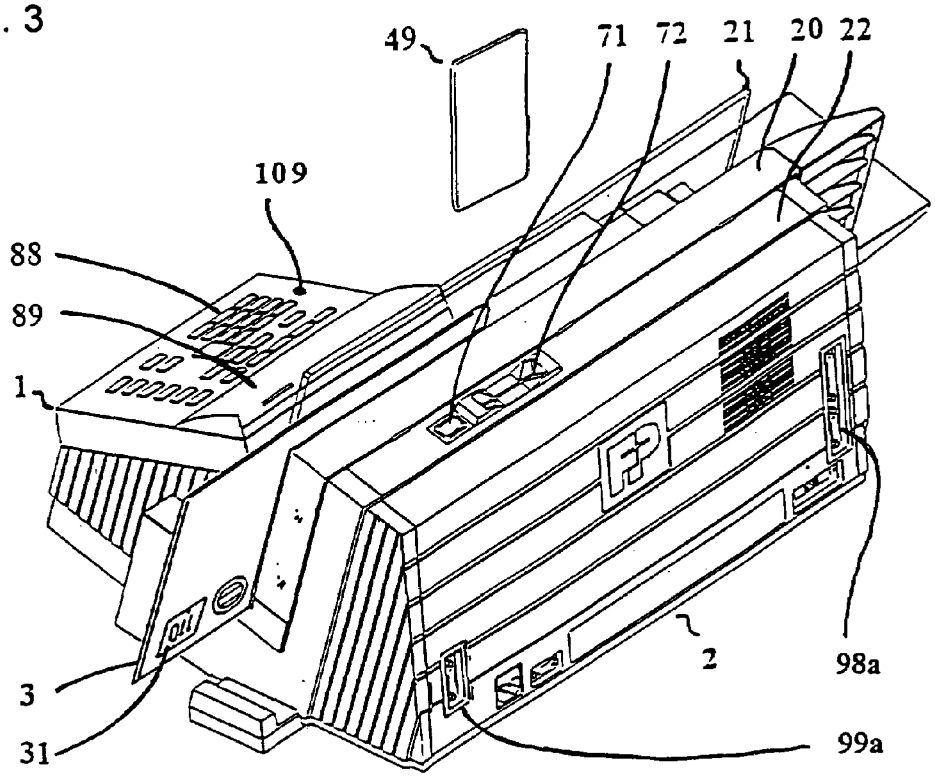
FIG. 3 is a perspective view of the postage meter machine of FIG. 2 from behind.
FIG. 9 shows a table for status signaling in accordance with the invention.

FIG. 3 shows a perspective view of the postage meter machine from behind. The postage meter machine is composed of a meter 1 and a base 2. The latter is equipped with a chip card write/read unit 70 that is arranged behind the guide plate 20 and is accessible from the upper edge 22 of the housing. After the postage meter machine has been turned on with the switch 71, a chip card 49 is plugged into the plug-in slot 72 from top to bottom. A letter 3 is supplied standing on edge with a surface to be printed lying against the guide plate 20, and is then printed with a franking stamp 31 in conformity with the input data. The letter delivery opening is laterally limited by a transparent plate 21 and by the guide plate 20. The status display of the security module 100 plugged onto the motherboard 9 of the meter 1 is visible from the outside through an opening 109.

Figure 4:
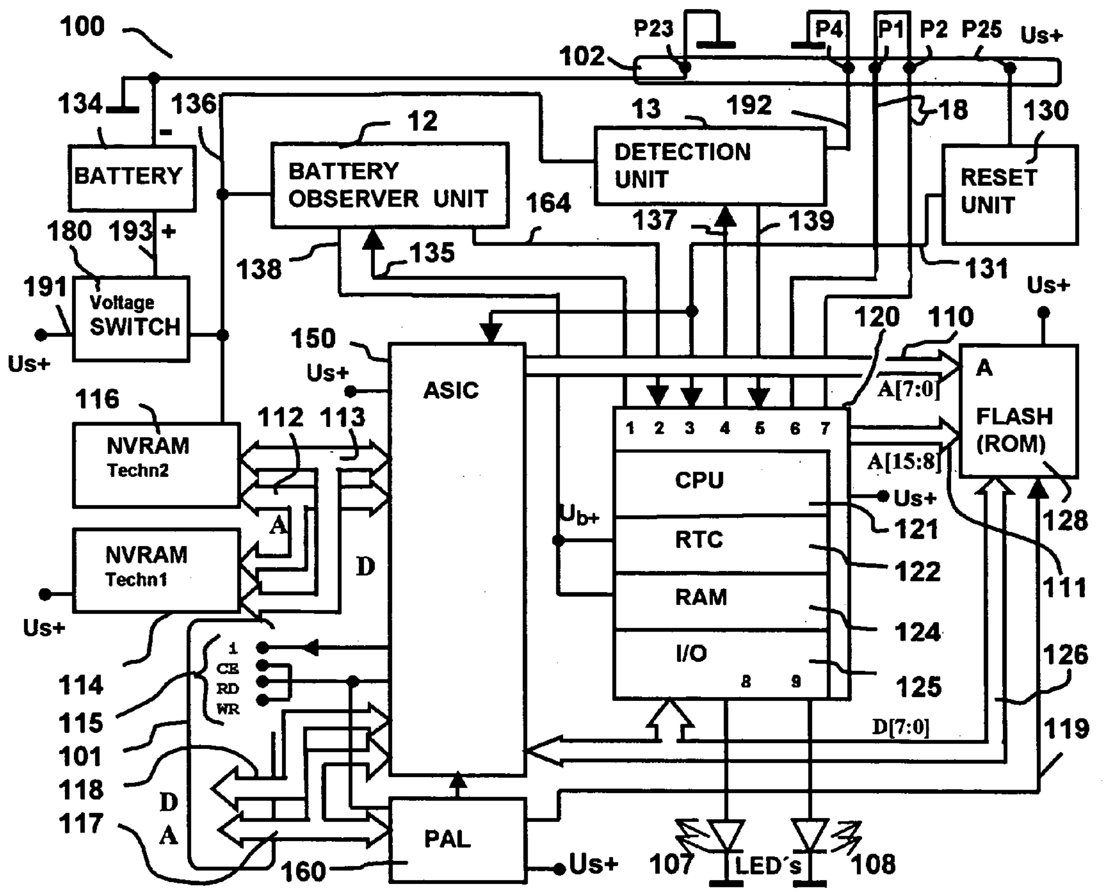
FIG. 4 is a block circuit diagram of the inventive security module in a second embodiment.

FIG. 4 shows a block circuit diagram of the postal security module PSM 100 in a preferred version. The negative pole of the battery 134 is at ground and connected to a pin P23 of the contact group 102. The positive pole of the battery 134 is connected via a line 193 to one input of the voltage switchover 180, and the line 191 carrying the system voltage is connected to the other input of the voltage switchover 180. The type SL-389/P is suitable as the battery 134 for a service life of up to 3.5 years, or the type SL-386/P is suitable for a service life of up to six years given maximum power consumption by the PSM 100. A commercially obtainable circuit of the type ADM 8693ARN can be utilized as the voltage switchover 180. The output of the voltage switchover 180 is supplied to the battery monitoring unit 12 and the detection unit 13 via the line 136. The battery monitoring unit 12 and the detection unit 13 are in communication with the pins 1, 2, 4 and 5 of the processor 120 via the lines 135, 164 and 137, 139. The output of the voltage switchover 180 also is connected via the line 136 to the supply input of a first memory SRAM that serves as a non-volatile memory NVRAM in a first technology as a result of the existing battery 134.

The security module is in communication with the postage meter machine via the system bus 115, 117, 118. The processor 120 can enter into a communication connection with a remote data center via the system bus and a modem 83. The accounting is accomplished by the ASIC 150. The postal accounting data are stored in non-volatile memories of different technologies.

The system voltage is at the supply input of a second memory 114. This is a non-volatile memory (NVRAM) in a second technology (SHADOW RAM). This second technology preferably includes a RAM and an EEPROM, the latter automatically accepting the data contents given an outage of the system voltage. The NVRAM 114 in the second technology is connected to the corresponding address and data inputs of the ASIC 150 via an internal address and data bus 112, 113.

The ASIC 150 contains at least one hardware accounting unit for calculating the postal data to be stored. Access logic to the ASIC 150 is accommodated in the programmable array logic unit 160. The ASIC 150 is controlled by the logic unit 160. An address and control bus 117, 115 from the motherboard 9 is connected to corresponding pins of the logic unit 160, and the logic unit 160 generates at least one control signal for the ASIC 150 and one control signal 119 for the program memory 128. The processor 120 processes a program that is stored in the memory 128. The processor 120, memory 28, ASIC 150 an logic unit 160 are connected to one another via a module-internal system bus that contains lines 110, 111, 126, 119 for data, address and control signals.

The processor 120 of the security module 100 is connected via a module-internal data bus 126 to the memory 128 and to the ASIC 150. The memory 128 serves as a program memory and is supplied with system voltage $U_{s+}$, for example, a 128 Kbyte FLASH memory of the type AM29F010-45EC. The ASIC 150 of the postal security module 100—via a module-internal address bus 110—delivers the addresses 0 through 7 to the corresponding address inputs of the memory 128. The processor 120 of the security module 100—via an internal address bus 111—delivers the addresses 8 through 15 to the corresponding address inputs of the FLASH 128. The ASIC 150 of the security module 100 is in communication with the data bus 118, with the address bus 117 and the control bus 115 of the motherboard 9 via the contact group 101 of the interface 8.

The processor 120 has access memories 122, 124 to which an operating voltage $U_{b+}$ is supplied from a voltage monitoring unit 12. In particular, the real time clock (RTC) 122 and the memory (RAM) 124 are supplied with an operating voltage via the line 138. The voltage monitoring unit (battery observer) 12 also supplies a status signal 164 and reacts to a control signal 135. The voltage switchover 180 outputs the higher of its input voltages as an output voltage on the line 136 for the battery observer 12 and memory 116. Due to the capability of automatically feeding the described circuit with the higher of the two voltages $U_{s+}$ and $U_{b+}$ dependent on their amplitude, the battery 134 can be replaced during normal operation without data loss.

In the quiescent times outside normal operation, the battery of the postage meter machine supplies the real time clock 122 with date and/or time of day registers and/or the static memory (SRAM) 124 that maintains security-relevant data in the aforementioned way. If the voltage of the battery drops below a specific limit during battery operation, then the circuit described in the exemplary embodiment connects the feed point for the clock 122 and the static memory 24 to ground, i.e. the voltage at the clock 122 and at the static memory 124 then lies at 0 volts. This causes the static memory 124 that, for example, contains important cryptographic keys, to be very rapidly erased. At the same time, the registers of the clock 122 are also deleted and the current time of day and the current date are lost. This action prevents a possible tamperer from stopping the clock 122 of the postage meter machine by manipulation of the battery voltage without losing security-relevant data. The tamperer thus is prevented from evading security measures such as, for example, long time watchdogs.

The reset unit 130 is connected via the line 131 to the pin 3 of the processor 120 and to a pin of the ASIC 150. The processor 120 and the ASIC 150 are reset by the reset signal from the reset unit 130 when the supply voltage drops.

Simultaneously with the indication of the under-voltage of the battery, the described circuit switches into a self-holding condition in which it remains when the voltage is subsequently increased. The next time the module 100 is switched on, the processor can interrogate the status of the circuit (status signal) and—in this way and/or via the interpretation of the contents of the erased memory—conclude that the battery voltage fell below a specific value in the interim. The processor 120 can reset the monitoring circuit, i.e. "arm" it.

For measuring the input voltage, the unplugged status detection unit 13 has a line 192 that is connected to ground via the plug of the security module 100 and the interface 8, preferably via a socket on the motherboard 9 of the postage meter machine. This measurement serves the purpose of statically monitoring the plugged condition and forms the basis for a monitoring on a first level. The unplugged status detection unit 13 has a resettable self-holding capability, the self-holding being triggered when the voltage level on a test voltage line 192 deviates from a predetermined potential. The evaluation logic includes the processor 120 connected to the other function units, the processor 120 being programmed to identify the status of the security module 100 and to modify it. The self-holding condition can be interrogated by the processor 120 of the security module 100 via the line 139. The test voltage potential on the line 192 corresponds to ground potential when the security module 100 has been properly plugged. Operating voltage potential is normally present on the line 139, ground voltage potential is present on the line 139 when the security module 100 is unplugged. The processor 120 has a fifth pin 5 to which the line 139 is connected in order to interrogate the condition of the unplugged status detection unit 13 as to whether it is connected to ground potential with self-holding. In order to reset the condition of the self-holding of the unplugged status detection unit 13 via the line 137, the processor 120 has a fourth pin 4.

A current loop 18 is also provided that likewise connects the pins 6 and 7 of the processor 120 via the plug of the security module 100 and via the socket on the motherboard 9 of the postage meter machine. The lines at the pins 6 and 7 of the processor 120 are closed to form a current loop 18 only when the security module 100 is plugged onto the motherboard 9. This loop 18 forms the basis for a dynamic monitoring of the plugged condition of the security module 100 on a second level.

The processor 120 contains a processor unit (CPU) 121, the real time clock (RTC) 122, the memory (RAM) unit 124 and an input/output unit 125. The processor 120 is equipped with pins 8, 9 for outputting one signal for signaling the condition of the security module 100. I/O ports of the input/output unit 125 are connected to the pins 8 and 9, internal signal elements of the module being connected thereto, for example, colored light-emitting diodes LEDs 107, 108 that signal the condition of the security module 100. The security module 100 can assume various conditions in its life cycle. Thus, for example, one must detect whether the module 100 contains valid cryptographic keys. Further, it is also important to distinguish whether the module 100 is functioning or is malfunctioning. The exact nature and number of module conditions is dependent on the realized function in the module 100 and on the implementation.

Figure 5:
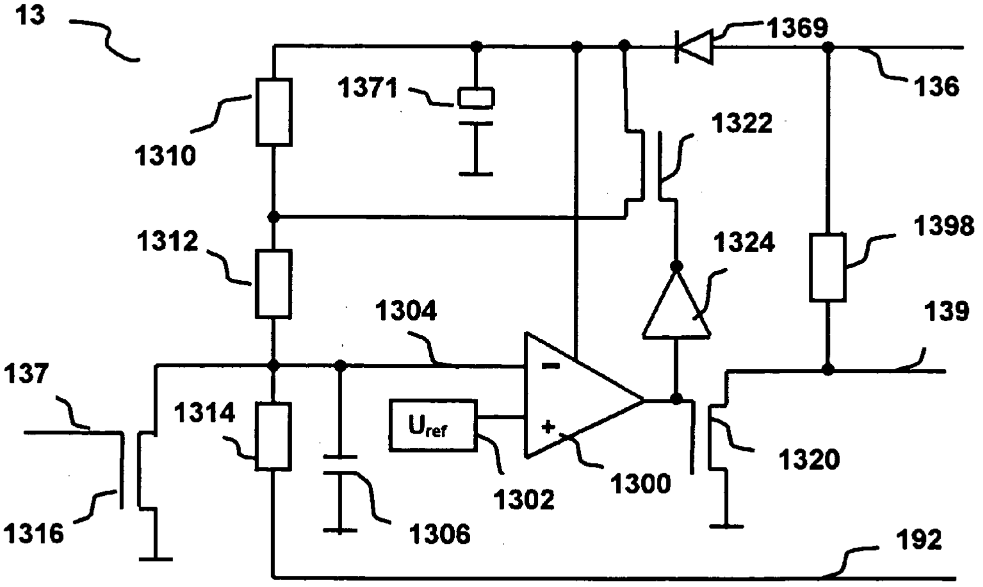
FIG. 5 is a circuit diagram of the voltage monitoring unit in the inventive security module.

The circuit diagram of the detection unit 13 is explained with reference to FIG. 5. The unplugged status detection unit 13 includes a voltage divider that is composed of a series circuit of resistors 1310, 1312, 1314 and connected across the supply voltage, that can be tapped by a capacitor 1371, and a test voltage on the line 192. The circuit is supplied with the system or battery voltage via the line 136. The supply voltage from the line 136 proceeds via a diode 1369 to the capacitor 1371. An inverter is connected at the output side of the circuit and is formed by a transistor 1320 and a resistor 1398. In the normal condition, the transistor 1320 of the inverter is inhibited, and the supply voltage takes effect via the resistor 1398 on the line 139, which therefore carries logic "1", i.e. high-level in the normal condition. A low-level on the line 139 is advantageous as the status signal for the unplugged condition because no power then flows into the pin 5 of the processor 120, thereby lengthening the life of the battery. The diode 1369 operates together with an electrolytic capacitor 1371 to ensure that the circuit preceding the inverter is supplied with a voltage over a relatively long time span (>2 s), so it still functions even though the voltage on the line 136 is absent.

The voltage divider 1310, 1312, 1314 has a tap 1304 to which a capacitor 1306 and the non-inverting input of a comparator 1300 are connected. The inverting input of the comparator 1300 is connected to a reference voltage 1302. The output of the comparator 1300 is connected to the line 139 via the inverter and is connected to the control input of a switch element 1322 for the aforementioned self-holding. The switch element 1322 is connected in parallel with the resistor 1310 of the voltage divider, and another switch element 1316 for resetting the self-holding is connected between the tap 1304 and ground. The tap 1304 of the voltage divider is at the junction of the resistors 1312 and 1314. The capacitor 1306 connected between the tap 1304 and ground prevents oscillations. The voltage at the tap 1304 of the voltage divider is compared in the comparator 1300 to the reference voltage of the source 1302. When the voltage at the tap 1304 is lower than the reference voltage of the source 1302, then the comparator output remains switched to the low level, and the transistor 1320 of the inverter is inhibited. As a result, the line 139 receives operating voltage potential and the status signal carries logic "1". The voltage divider is dimensioned such that, given ground potential on the line 192, the tap 1304 is at a voltage that is sure to lie below the switching threshold of the comparator 1300. When the connection is interrupted and the line 192 is no longer connected to ground because the security module 100 was separated from the socket on the motherboard 9 or respectively, interface unit 8 of the postage meter machine, then the voltage at the tap 1304 is pulled above the voltage of the reference voltage source 1302 and the comparator 1300 switches. The comparator output is switched to high level and, consequently, the transistor 1320 is conducting. As a result, the line 139 is connected to ground potential and the status signal carries logic "0".

A self-hold circuit in the unplugged status detection unit 13 is realized by a transistor 1322 that is connected in parallel to the resistor 1310 of the voltage divider. The control input of this transistor 1322 is switched to high level by the comparator output. As a result, the transistor 1322 conducts and bridges the resistor 1310. As a result, the voltage divider is now formed only by the resistors 1312 and 1314. This causes the switchover threshold to be raised to such an extent that the comparator 1300 also remains in the switched condition when the line 192 again carries ground potential because the security module 100 was re-plugged.

The condition of the circuit can be interrogated by the processor 120 via the signal on the line 139.

The circuitry of the unplugged status detection unit 13 includes a line 137 and the switch element 1316 for resetting the self-holding, with resetting being triggered by the processor 120 via a signal on the line 137.

The processor 120 can communicate with a remote data center at any time via the application specific integrated circuit (ASIC) 150, a first contact group 101, a system bus of the control unit 1 and, for example, via the microprocessor 91. Communication proceeds via a modem 83, such as to a remote data center, for checking the accounting data and if necessary for communicating further data to the processor 120. The ASIC 150 of the security module 100 is connected to the processor 120 via an internal data bus 126 of the module 100.

The processor 120 can reset the unplugged status detection unit 13 when a reinstallation was able to be successfully completed with the communicated data. To that end, the transistor 1316 is made conducting by the reset signal on the line 137 and, thus, the voltage at the tap 1304 is pulled below the reference voltage of the source 1302 and the transistors 1320 and 1322 inhibit. When the transistor 1322 is inhibited in the normal condition, then the resistors 1310 and 1312 form the upper part of the aforementioned voltage divider in series, and the switchover threshold is in turn lowered to the original level.

Figure 6:
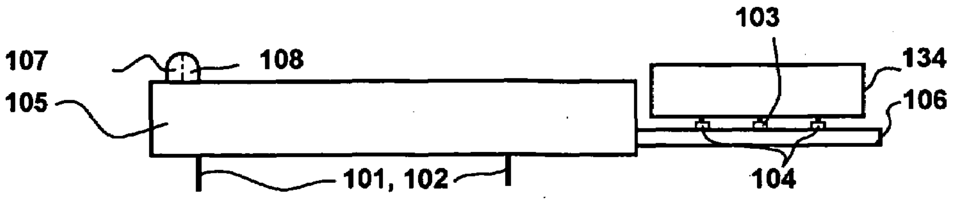
FIG. 6 is a side view of the inventive security module.

FIG. 6 shows a side view of the mechanical structure of the security module. The security module is fashioned as a multi-chip module, i.e. a number of function units are interconnected on a printed circuit board 106. The security module 100 is potted with a hard casting compound 105, and the battery 134 of the security module 100 is replaceably arranged on the printed circuit board 106 outside the casting compound 105. For example, it is potted with the casting material 105 so that signal elements 107, 108 project from the casting material 106 in a first location, and such that the printed circuit board 106 with the plugged battery 134 projects laterally at a second location. The printed circuit board 106 also has battery contact posts 103 and 104 for the connection of the poles of the battery 134, preferably on the equipping side above the printed circuit board 106. For plugging the postal security module 100 onto the motherboard 9 of the meter 1, the contact groups 101 and 102 are arranged under the printed circuit board 106 (interconnect side) of the security module 100. Via the first contact group 101, the application circuit ASIC 150 is in communication—in a way that is not shown—with the system bus of the control unit 1, and the second contact group 102 serves the purpose of supplying the security module 100 with the system voltage. When the security module 100 is plugged onto the motherboard 9, it is preferably arranged such within the meter housing so that the signal elements 107, 108 are close to an opening 109 or projects there into. The meter housing is thus designed such that the user can see the status display of the security module from the outside. The two signal elements (light-emitting diodes) 107 and 108 are controlled via two output signals of the I/O ports at the pins 8, 9 of the processor 120. Both light-emitting diodes are accommodated in a common component housing (bi-color light-emitting diode), for which reason the dimensions or the diameter of the opening can be relatively small, on the order of magnitude of the signal element. Three different colors can be displayed (red, green, orange). For distinguishing between statuses, the LEDs are also used in blinking fashion, so that eight different status groups can be distinguished, these being characterized, for example by the following LED conditions: LED red, LED green, LED orange, LED blinking red, LED blinking green, LED blinking orange, LED red and blinking orange.

Figure 7:
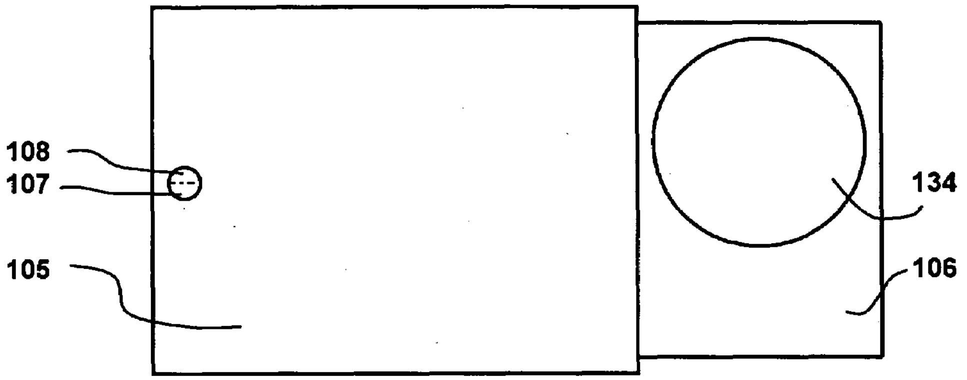
FIG. 7 is a plan view onto the inventive security module.
Figure 8A:
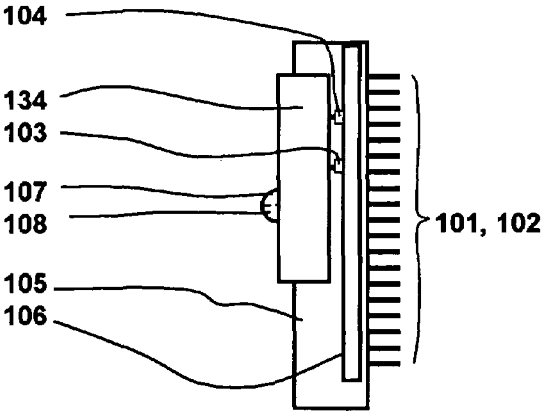
FIG. 8*a* is a view of the inventive security module from the right.
Figure 8B:
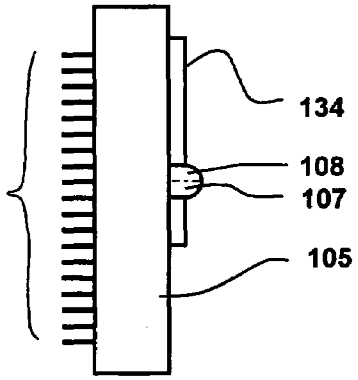
FIG. 8*b* is a view of the inventive security module from the left.

FIG. 7 shows a plan view onto the postal security module. FIGS. 8*a* and 8*b* show views of the security module from the right and, respectively left. The position of the contact groups 101 and 102 on the printed circuit board 106 can be seen from FIGS. 8*a* and 8*b* in conjunction with FIG. 6.

In the table for status signaling shown in FIG. 9, a number of possible status displays are shown. A green-emitting LED 107 signals an OK condition 220, but an emitting LED 108 signals an error status 230 as the result of at least one static self-test. Due to the direct signaling via the LEDs 107, 108, the result of such an inherently known self-test cannot be falsified.

If, for example, the keys stored in the security module were lost in the meantime, the ongoing checking in the dynamic mode would identify the error and signal this as the status 240 with orange-emitting LEDs. Booting is required after switching off/on, since no other operation can be implemented otherwise. The status that the manufacturer failed to install a key is signaled as status 260, for example with an LED 107 flashing green.

The first function unit is the processor 120. The processor 120 continuously monitors a second time credit to determine whether it has expired. This occurs when a long duration timer times out. The long duration timer times out if the data center has not been contacted for an overly long time, for example to reload a credit. For example, the data center prescribes 90 days as this second time credit and this is loaded into a memory of the security device during installation or given reloading. After the expiration of these 90 days, a "LOST" condition 250 is signaled by an LED flashing red. The long duration timer is preferably a backward counter that is realized in the processor 120. Since the counter reading of zero is reached given expiration of the time, the status 250 likewise remains if the security module was separated from the module after the "LOST" condition was reached. If the last contact with the data center was so long ago as to seem suspicious, the suspect status 270 is signaled. This condition is determined by monitoring a first time credit of, for example, 30 days, with another timer, preferably also a backward counter, which is likewise realized in the processor 120.

Further status displays for the statuses 280 and 290 are optionally provided for various further checks. Further function units, particularly a temperature sensor, can be provided in the security module 100 for this purpose. When, for example, a temperature that could lead to damage in the security module 100 is exceeded, then this condition 280 can be signaled with the LEDs 107, 108 that emit red and flash orange and thus produce the overall effect of flashing red/orange in alternation. As warranted, the second function unit can monitor the battery voltage to determine whether the capacity thereof has been drained. A status 290 for a required replacement of the battery can be signaled with the LEDs 107, 108, emitting green and flashing orange and thus producing the overall effect of flashing green/orange in alternation.

Figure 10:
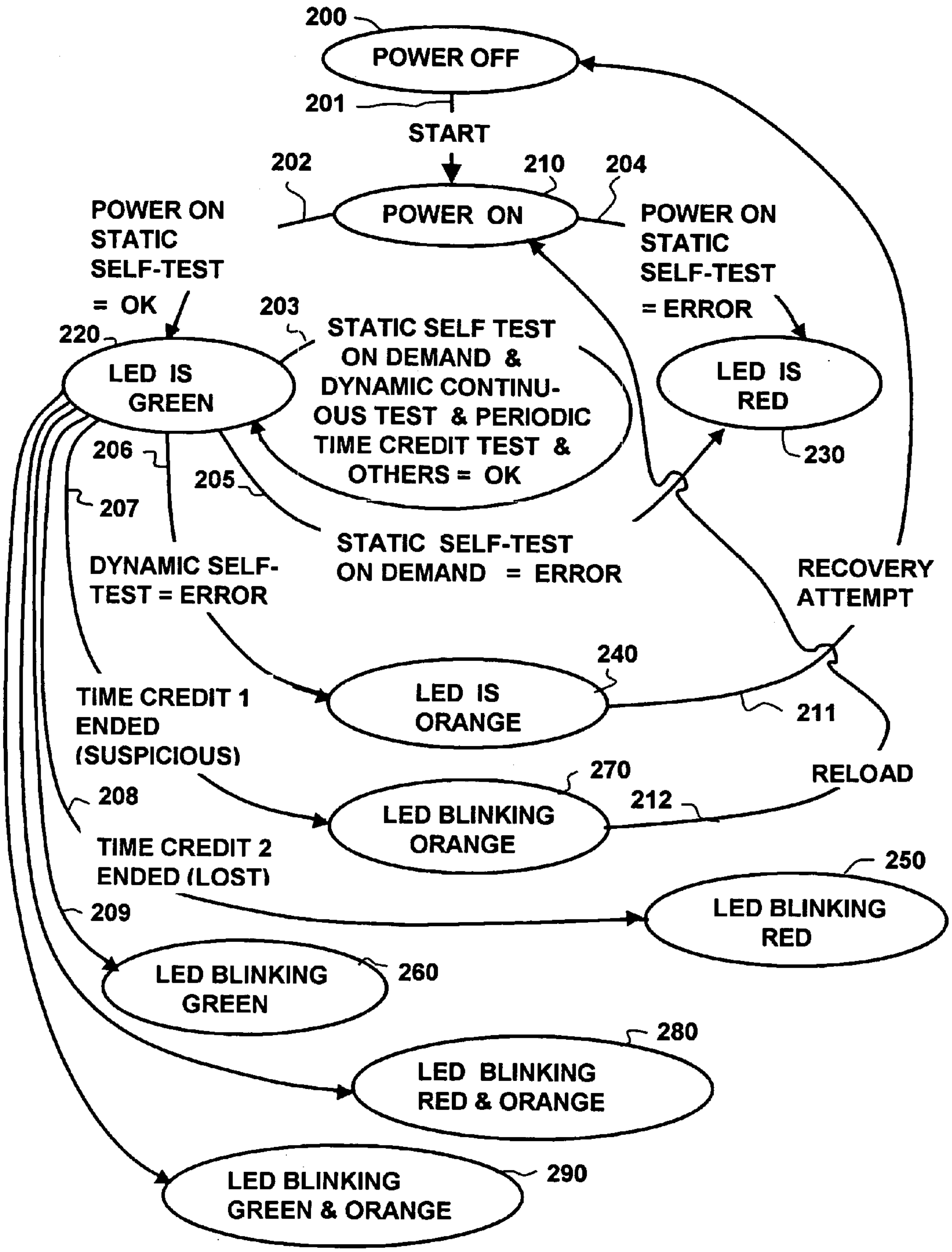
FIG. 10 illustrates tests in the system for statically and dynamically changeable statuses in accordance with the invention.

FIG. 10 shows an illustration of the checks in the system for statically and dynamically changeable conditions. After being turned on, a deactivated system in the status 200 switches via the transition Start 210 into the status 210 wherein the security module 100 implements a static self-test as soon as the operating voltage is adjacent. In the transition 202, when the self-test produces a correct (OK) result, the status 220 with LED 107 emitting green is signaled. Proceeding from this latter condition, a dynamic continuous test, at least one periodic time credit test and other tests can be implemented. A transition incorporating such tests leads back to the status 220, LED 107 emitting green given an OK status. A transition 206 leads to the status 240 and the LEDs emit orange given an error detected during the dynamic self-test. This error can be eliminated by a recovery attempt, possibly by shutting the device off (transition 211) and turning the device on again (transition 201). Static errors, however, cannot be eliminated. From the status 210 wherein the activated device implements a static self-test, a transition 204 to the status 230 exists given an error, and the LED 108 emits red. A static self-test implemented on demand at any time the device is in status 220 (LED green) can, given an error, lead via a transition 205 to the status 230 (LED red). Proceeding from the status 220 (LED green), further transitions 207, 208, 209 lead to the further statuses 270, 250, 260. In the status 270, LEDs 107, 108 blinking orange signal that the connection to the data center should be undertaken, since the security device is already considered suspect. The status 210 is reached again via the transition 212, which yields the reloading.

In the status 250, the LED 108 blinking red signals the "LOST" status. In the transition 209, wherein a further self-test of the processor 120 yields a requirement for reloading a key, the status 260 with LED 107 blinking green is reached.

Proceeding from the status 220 (LED 107 green), optional, further transitions can lead either to the further status 280 with LEDs emitting red/blinking orange or to the status 290 with LEDs emitting green/blinking orange. In the first optional transition, a temperature measurement yields a need to replace the entire security module 100. In the latter transition, a capacity measurement of the battery 134 indicates a need to change the battery 134.

Figure 11:
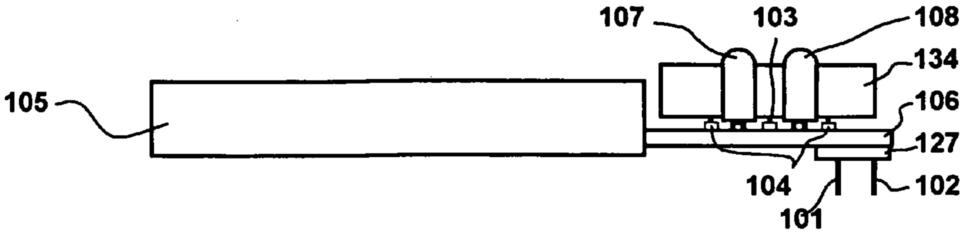
FIG. 11 is a side view of the inventive security module (second version).

FIG. 11 shows a side view of the mechanical structure of the security module 100 according to a second version thereof. The security module is again fashioned as a multichip module and is potted with a hard casting compound 105. The battery 134 of the security module 100 is replaceably arranged on the printed circuit board 106 outside the casting compound 105. For cost reasons, the portion of the printed circuit board 106 is covered with a casting material 105, with the signal elements 107, 108 and the plugged battery 134 being mounted at a second portion on the upper side of the printed circuit board 106 outside of the casting material 105. The printed circuit board 106 has battery contact posts 103 and 104 for the connection of the poles of the battery 134, preferably on the equipping side above the printed circuit board 106. In this version, the two light-emitting diodes 107 and 108 forming the signal elements are separate components. The two light-emitting diodes 107 and 108 are driven via two output signals of the I/O ports at the pins 8, 9 of the processor 120. The LEDs 107, 108 can also be driven in blinking fashion for distinguishing between statuses, so that various status groups can be distinguished from one another. The meter housing is likewise designed so that the user can see the status display of the security module 100 from the outside, for example through a viewing window or an opening 109.

For plugging the postal security module PSM 100 onto the motherboard of the meter 1, contact groups 101 and 102 are arranged under the printed circuit board 106 of the security module 100. A connector 127 contains the contact groups 101 and 102, this connector 127 being arranged on the interconnect side of the printed circuit board 106.

Figure 12:
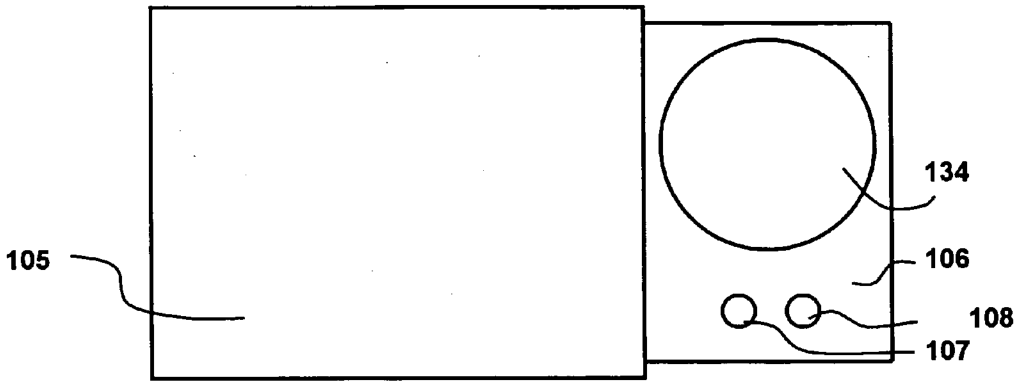
FIG. 12 is a plan view of the inventive security module (second version).

FIG. 12 shows a plan view of the second version of the postal security module 100. The casting compound 105 surrounds the first part of the printed circuit board 106 cuboid-like, whereas the second part of the printed circuit board 106 for the two light-emitting diodes 107 and 108, the replaceably arranged battery 134 and for the connector 127 (not visible here) remains free of casting compound. The battery contact posts 103 and 104 are covered by the battery in FIG. 12 but are visible in the side view of FIG. 13*a*, as is the connector 127.

The casting of the first part of the printed circuit board 106 exhibits neither openings nor projections and thus offers fewer points of attack for tampering. The casting material 105 is preferably a two-component epoxy resin or polymer or plastic. The casting compound STYCAST® 2651-40 FR of the Emerson & Cuming company with (preferably) Catalyst 9 as the second component is suitable. The two components are mixed in the casting process and the mixture is applied onto both sides of the printed circuit board 106 in the first part thereof. This can ensue, for example, by immersion into the viscous mixture. A protective layer and/or a sensor layer (not visible from the outside after a final, outer casting) can then be applied, this bonding with the casting material 105 during the curing thereof. After the final, outer casting, the casting compound hardens to form a solid, opaque casting material 105.

Figure 13A:
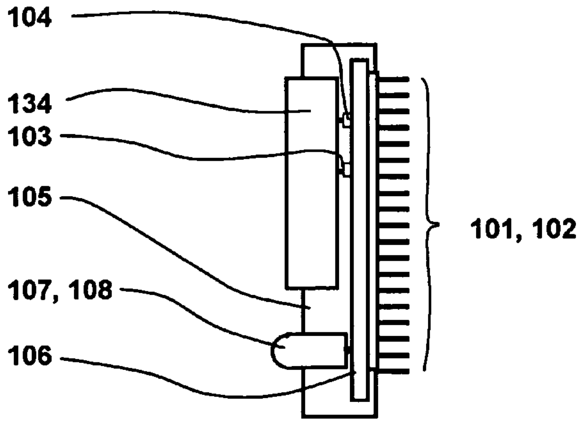
FIG. 13*a* is a view of the inventive security module from the right (second version).
Figure 13B:
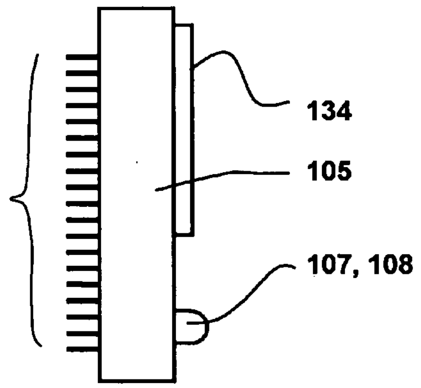
FIG. 13*b* is a view of the inventive security module from the left (second version).

FIGS. 13*a* and 13*b* show views of the second version of the security module from the right and the left, respectively. The position of the connector 127 with the contact groups 101 and 102 under the printed circuit board 106 is more clearly visible from FIGS. 13*a* and 13*b* in conjunction with FIG. 12. The connector 127 can be alternatively applied (in a way that is not shown) on the upper side of the second part of the printed circuit board 106.

Of course, some other signal elements can be utilized in conjunction with a postal device.

Inventively, the postal device is a postage meter machine. The security module, as a postal security device (PSD), can then be approved by the respective postal authority.

The security module or PSD can have a different structural form, for example, allowing it to be plugged onto the motherboard of a personal computer that drives a commercially obtainable printer as a PC franker.

Although modifications and changes may be suggested by those skilled in the art, it is the intention of the inventors to embody within the patent warranted hereon all changes and modifications as reasonably and properly come within the scope of their contribution to the art.

We claim:

1. A method for protecting a security module comprising the steps of:

storing security relevant data in a non-volatile memory of a security module and inserting said security module in a device motherboard;

monitoring proper insertion of said security module on said device motherboard with a first function unit and a second function unit in said security module;

signaling at least one security-related status of said security module with said first function unit;

in said monitoring of proper insertion, detecting a status indicating at least one of improper use and improper replacement of said security module with said second function unit and, upon a detection of said status indicating at least one of said improper use and said improper replacement, said second function unit causing said security-relevant data to be erased;

in said monitoring of proper insertion, monitoring a continued existence of said status with said second function unit and detecting, with said second function unit, when said status no longer exists;

when said second function unit detects that said status no longer exists, initiating re-initializing, with said first function unit, any erased, security-relevant data; and after said re-initializing, enabling each of said first function unit and said second function unit to re-commission said security module.

2. A method as claimed in claim 1 comprising the additional steps of:

storing security relevant data in a security module and inserting said security module in a device motherboard;

normally operating said security module with system voltage from a device containing said device motherboard and, in an absence of said system voltage, operating said security module with a batter; and monitoring a status of said battery with said second function unit as said status indicating at least one of said improper use and said improper replacement.

3. A method as claimed in claim 1 comprising providing a third function unit and inhibiting said security module with said third function unit during at least one of replacement of said security module on said device motherboard and damage to said security module.

4. A method as claimed in claim 3 comprising detecting said damage to said security module with said third function unit.

5. A method as claimed in claim 1 comprising evaluating a running time credit with said first function unit and, upon expiration of said time credit, signaling a suspicious status of said security module with said first function unit.

6. A method as claimed in claim 5 comprising the additional steps of:

after expiration of said time credit, said first function unit establishing a communication with a remote data source; and restoring normal operation to said security module via said communication.

7. A method as claimed in claim 5 comprising selecting a duration of said time credit to obtain a time credit of selected duration, and loading said time credit of selected duration into a memory in said security module, said memory being accessible by said first function unit.

8. A method as claimed in claim 5 wherein said time credit is a first time credit, and comprising the additional steps of monitoring a second time credit with said first function unit, which is longer than said first time credit, and signaling a status designating a device containing said device motherboard as being inoperable when said second time credit expires.

* * * * *